UNITED STATES PATENT OFFICE.

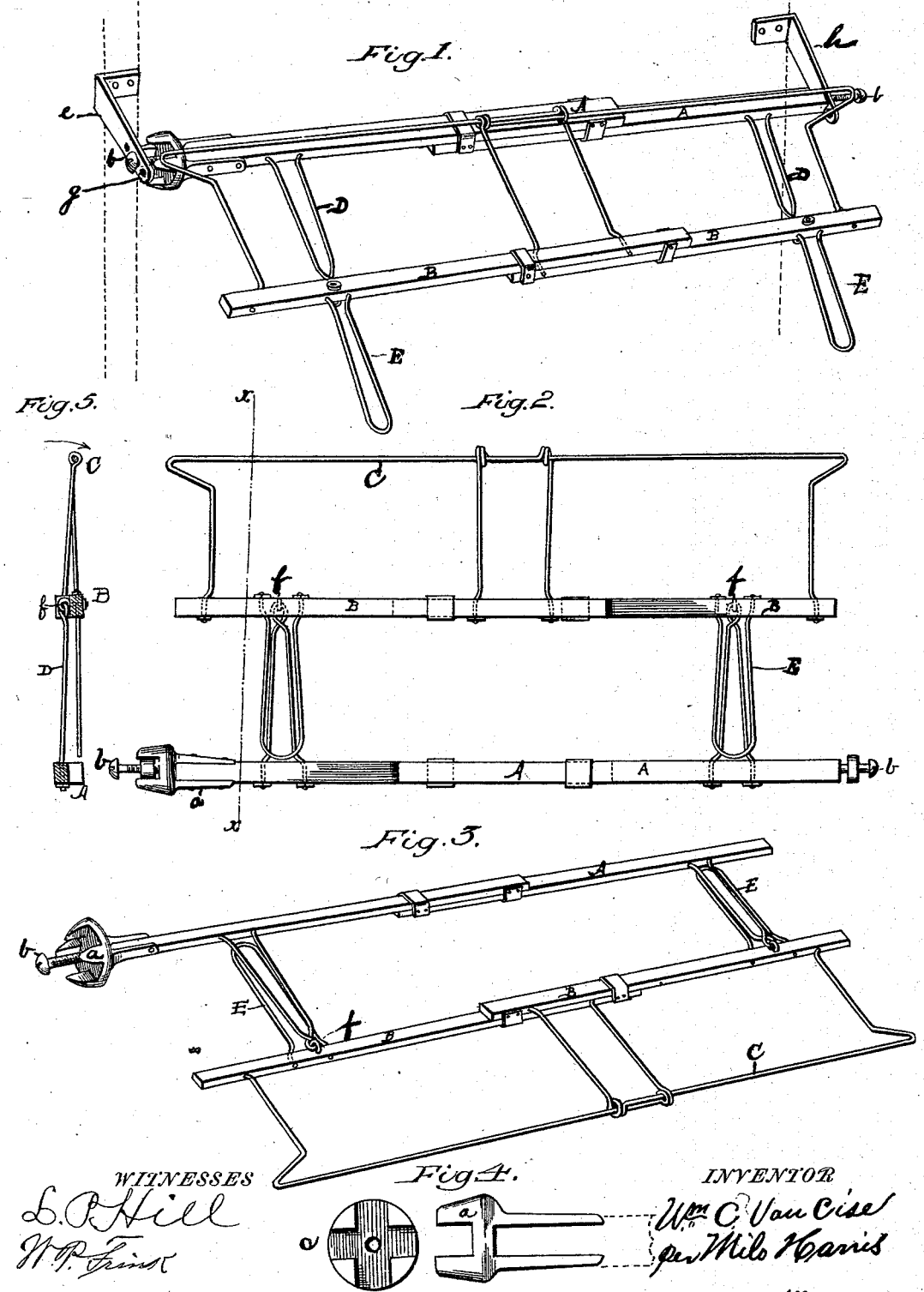

WILLIAM C. VAN CISE, OF JAMESTOWN, NEW YORK.

PILLOW-SHAM HOLDER.

SPECIFICATION forming part of Letters Patent No. 413,214, dated October 22, 1889.

Application filed October 16, 1888. Serial No. 288,216. (No model.)

*To all whom it may concern:*

Be it known that I, WILLIAM C. VAN CISE, a citizen of the United States, residing at the city of Jamestown, in the county of Chautauqua and State of New York, have invented certain new and useful Improvements in Pillow-Sham Holders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to provide a strong and durable pillow-sham holder; and the improvement consists in making the main frame in two sections and so connecting them that when raised for the night the shams are carried high enough to get them out of the way of the pillows without the shams being folded or creased; also, in a novel mechanism for locking the frame in an upright or horizontal position, all of which will be fully understood by this specification and the accompanying drawings, in which—

Figure 1 is a perspective view; Fig. 2, an elevation. Fig. 3 shows holder in horizontal position. Fig. 4 shows the casting which, combined with the bracket, forms the lock; Fig. 5, a view of wire-frame connection in cross-section.

A represents two sliding wooden bars, having end connections and brackets $e\,h$, as shown in Fig. 1, the brackets extending across the edge of head-board and secured to the back of the same by screws.

$a$ is a double-forked casting securely fastened to one end of bar A, the brackets $e\,h$ being provided with two or more holes so arranged near their outer end that the screws $b$ can be placed in these different holes to adjust the holder to different thicknesses of head-board, said screws being left out long enough so that the forked casting $a$ will allow the bar to be turned on same, and by sliding endwise engage said casting with the bracket $e$, so as to secure the holder in an upright or horizontal position, as desired. Passing through and securely fastened to the bars A are wire arms D D, having loops at their outer ends passing through stationary eyes $f\,f$ in bars B B, for the purpose of forming a hinge, as shown in Fig. 2.

The bars B B have secured to them the wire frame C, and along the upper line of this frame, Fig. 2, is secured the upper edge of the pillow-shams in any suitable manner. The bars B B have long wire arms E E, as shown, for the purpose of holding the section of the holder in an upright or horizontal position, as will be readily understood from the drawings.

The operation and use are as follows: The sections A A are drawn out and the brackets $e\,h$ secured to the back of bedstead, the pillow-shams being secured to the wire frame, as described. The arms E E extend over the pillows. By taking hold of the ends of bars B B and raising the same the frame A A turns in the brackets $e\,h$ and also turns on the hinges $f\,f$, and the whole is carried to the upright position, and by sliding endwise is securely locked, as shown in Fig. 2, thus holding the shams smooth and straight, overcoming the objection of creasing or soiling. Having different holes near the end in brackets, any desired thickness of bed-posts may be spanned, and the holder can be removed without taking off the brackets, and the brackets are in one piece.

Having thus described my invention, I claim—

In a pillow-sham holder, the sliding bars A and B, the connecting wire arms D, secured to the bars A and hinged to the bars B, the arms E, and the wire frame secured to the sliding bars, said arms being adapted to support the wire frame when the latter is thrown outward, and means for locking the holder in position, substantially as herein described.

In testimony whereof I affix my signature in presence of two witnesses.

WILLIAM C. VAN CISE.

Witnesses:
EGBURT E. WOODBURY,
GEO. R. BUTTS.